United States Patent
Khouphongsy et al.

(10) Patent No.: US 11,718,264 B1
(45) Date of Patent: Aug. 8, 2023

(54) SEATBELT WITH HEAD RESTRAINT SYSTEMS AND METHODS

(71) Applicant: TOYOTA MOTOR ENGINEERING & MANUFACTURING NORTH AMERICA, INC., Plano, TX (US)

(72) Inventors: Phouvadol P. Khouphongsy, Saline, MI (US); Umesh Gandhi, Farmington Hills, MI (US); Danil Prokhorov, Canton, MI (US); Yuyang Song, Ann Arbor, MI (US); Paul Gilmore, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/941,548

(22) Filed: Sep. 9, 2022

(51) Int. Cl.
| | |
|---|---|
| *B60R 21/18* | (2006.01) |
| *B60R 21/2338* | (2011.01) |
| *B60R 21/233* | (2006.01) |
| *B60R 21/231* | (2011.01) |

(52) U.S. Cl.
CPC ............ *B60R 21/231* (2013.01); *B60R 21/18* (2013.01); *B60R 21/233* (2013.01); *B60R 21/2338* (2013.01); *B60R 2021/23107* (2013.01); *B60R 2021/23308* (2013.01)

(58) Field of Classification Search
CPC .................................................... B60R 21/18
See application file for complete search history.

(56) References Cited

U.S. PATENT DOCUMENTS

| | | | |
|---|---|---|---|
| 5,472,231 A | 12/1995 | France | |
| 5,597,178 A | 1/1997 | Hardin, Jr. | |
| 7,600,780 B2 | 10/2009 | Tobata et al. | |
| 8,480,127 B2 | 7/2013 | Rathmann-Ramlow et al. | |
| 10,525,922 B1 * | 1/2020 | Lin ..................... | B60R 21/2338 |
| 11,104,291 B1 * | 8/2021 | Dennis .................. | B60R 21/214 |
| 11,203,318 B2 * | 12/2021 | McCool ............ | B60R 21/01554 |
| 11,584,329 B2 * | 2/2023 | Sung ..................... | B60R 21/207 |
| 2003/0011175 A1 * | 1/2003 | Hess .................... | B60R 21/2338 280/730.2 |
| 2004/0212185 A1 * | 10/2004 | Daines ................ | B60R 21/2338 280/743.2 |
| 2006/0028004 A1 * | 2/2006 | Oota ..................... | B60R 21/231 280/733 |

(Continued)

FOREIGN PATENT DOCUMENTS

| | | | | |
|---|---|---|---|---|
| EP | 1510414 A1 * | 3/2005 | ........... | B60R 21/232 |
| JP | H0492738 A * | 3/1992 | | |

(Continued)

*Primary Examiner* — Nicole T Verley
(74) *Attorney, Agent, or Firm* — Haynes and Boone, LLP (57) ABSTRACT

Systems and methods of a seatbelt with head restraint are provided. A seatbelt assembly for a vehicle may include a plurality of airbags and an electrostatic clutch to control a deployment of the plurality of airbags. The electrostatic clutch may be operable to limit a movement of the plurality of airbags relative to each other to define a deployment shape of the airbags. Associated vehicles including the seatbelt assembly are provided. Associated methods are also provided.

20 Claims, 9 Drawing Sheets

(56) References Cited

U.S. PATENT DOCUMENTS

| | | | | |
|---|---|---|---|---|
| 2008/0106083 A1* | 5/2008 | Walston | ............. | B60R 21/2338 |
| | | | | 280/743.2 |
| 2008/0106084 A1* | 5/2008 | Mitchell | ............... | B60R 21/232 |
| | | | | 280/743.1 |
| 2009/0179406 A1* | 7/2009 | Haraoka | ................. | B60R 21/18 |
| | | | | 280/733 |
| 2009/0256337 A1 | 10/2009 | Pan | | |
| 2020/0130632 A1* | 4/2020 | Sekizuka | ............. | B60R 21/231 |
| 2021/0354647 A1 | 11/2021 | Steinke et al. | | |

FOREIGN PATENT DOCUMENTS

| | | | | |
|---|---|---|---|---|
| WO | WO-2004069609 A1 * | 8/2004 | ........... | B60R 21/232 |
| WO | WO-2007145551 A1 * | 12/2007 | ............. | B60R 21/18 |

* cited by examiner

SEATBELT WITH HEAD RESTRAINT SYSTEMS AND METHODS

TECHNICAL FIELD

The present disclosure relates generally to vehicle occupant safety, and, more particularly, to systems and methods for a seatbelt having a head restraint.

BACKGROUND

Current inflatable seatbelts may provide chest restraint with little benefit to head restraint. An airbag mounted on the seat in front of a rear occupant may change the relative position of the airbag and the rear occupant depending on seat adjustment, thus reducing head restraint effectiveness.

BRIEF SUMMARY

Various embodiments of the present disclosure include a vehicle. The vehicle includes a seatbelt and an airbag unit mounted on the seatbelt. The airbag unit includes a plurality of airbags and an electrostatic clutch to control a deployment of the airbags. The electrostatic clutch is operable to limit a movement of the plurality of airbags relative to each other to define a deployment shape of the airbag unit.

Various embodiments of the present disclosure include a seatbelt assembly for a vehicle. The seatbelt assembly includes a plurality of airbags and an electrostatic clutch to control a deployment of the plurality of airbags. The electrostatic clutch is operable to limit a movement of the plurality of airbags relative to each other to define a deployment shape of the plurality of airbags.

Various embodiments of the present disclosure include a method. The method includes controlling a deployment of an airbag unit using an electrostatic clutch. The method further includes wherein the electrostatic clutch is operable to limit a movement of the airbag unit to define a deployment shape of the airbag unit.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to a seatbelt with head restraint systems and methods. In certain illustrative embodiments, a seatbelt assembly includes an airbag or airbag system that deploys to provide a head restraint for a belted occupant (e.g., a belted rear occupant) of a vehicle. To provide head restraint to a belted occupant, the airbag or airbag system may deploy forward and upward initially, then rearward toward the face of the rear occupant. In embodiments, a clutch (e.g., an electrostatic clutch) may control the trajectory of deployment of the airbag or airbag system.

Figure 1:
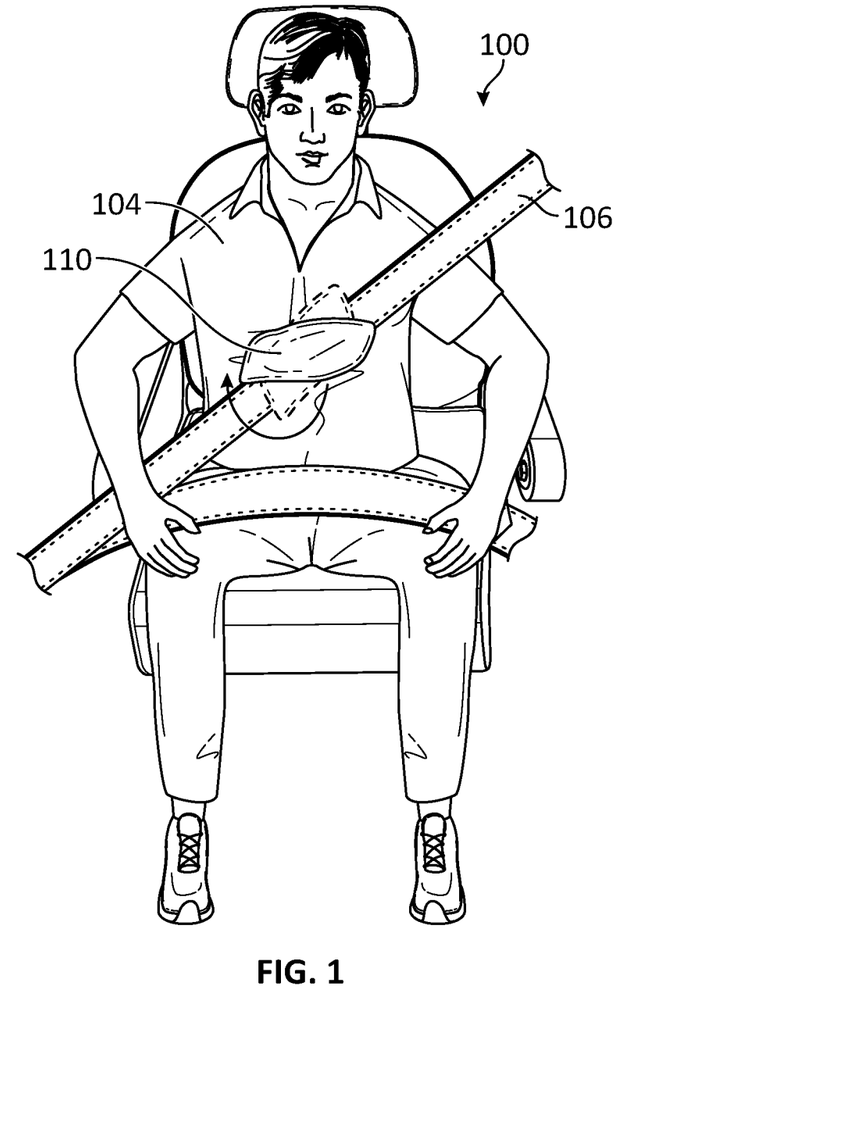
FIG. 1 is a diagram illustrating a seatbelt assembly, according to one or more embodiments of the disclosure.

FIG. 1 is a diagram illustrating a seatbelt assembly 100 for a vehicle, according to one or more embodiments of the disclosure. Referring to FIG. 1, seatbelt assembly 100 may secure a belted occupant 104 (e.g., a driver or passenger of a vehicle) against harmful movement that may result during a collision or a sudden stop. For example, seatbelt assembly 100 may reduce impacts with interior strike hazards (e.g., steering wheel, dash, seats, etc.), keep belted occupant 104 positioned correctly for maximum effectiveness of one or more safety systems (e.g., an airbag), and/or prevent the belted occupant 104 being ejected in a crash or other collision. As shown, seatbelt assembly 100 may include a three-point seatbelt 106 having a Y-shaped arrangement of a lap belt and a sash belt, although other configurations are contemplated, such as a two-point seatbelt, a single sash belt, a harness (e.g., a 4-7 point harness), etc.

In embodiments, seatbelt assembly 100 includes an airbag unit 110. Airbag unit 110 may be mounted or otherwise connected to seatbelt 106. For example, airbag unit 110 may be mounted to the sash or shoulder harness of seatbelt 106 near the chest area of the belted occupant 104. In embodiments, airbag unit 110 may be movable along seatbelt 106 to properly position airbag unit 110 (e.g., at the center of the chest area of belted occupant 104). Once properly positioned, airbag unit 110 be locked or otherwise secured in place to limit undesired movement.

Since airbag unit 110 is mounted diagonally at the chest area of belted occupant 104, airbag unit 110 may include one or more features to align airbag unit 110 at deployment. For instance, airbag unit 110 may include one or more tethers, clutches, and/or control systems to align a deployed airbag to the head of belted occupant 104, as described more fully below. For example, various mechanical and/or electrical systems may cause an airbag to twist during deployment to align the airbag to the belted occupant's head.

Figure 2:
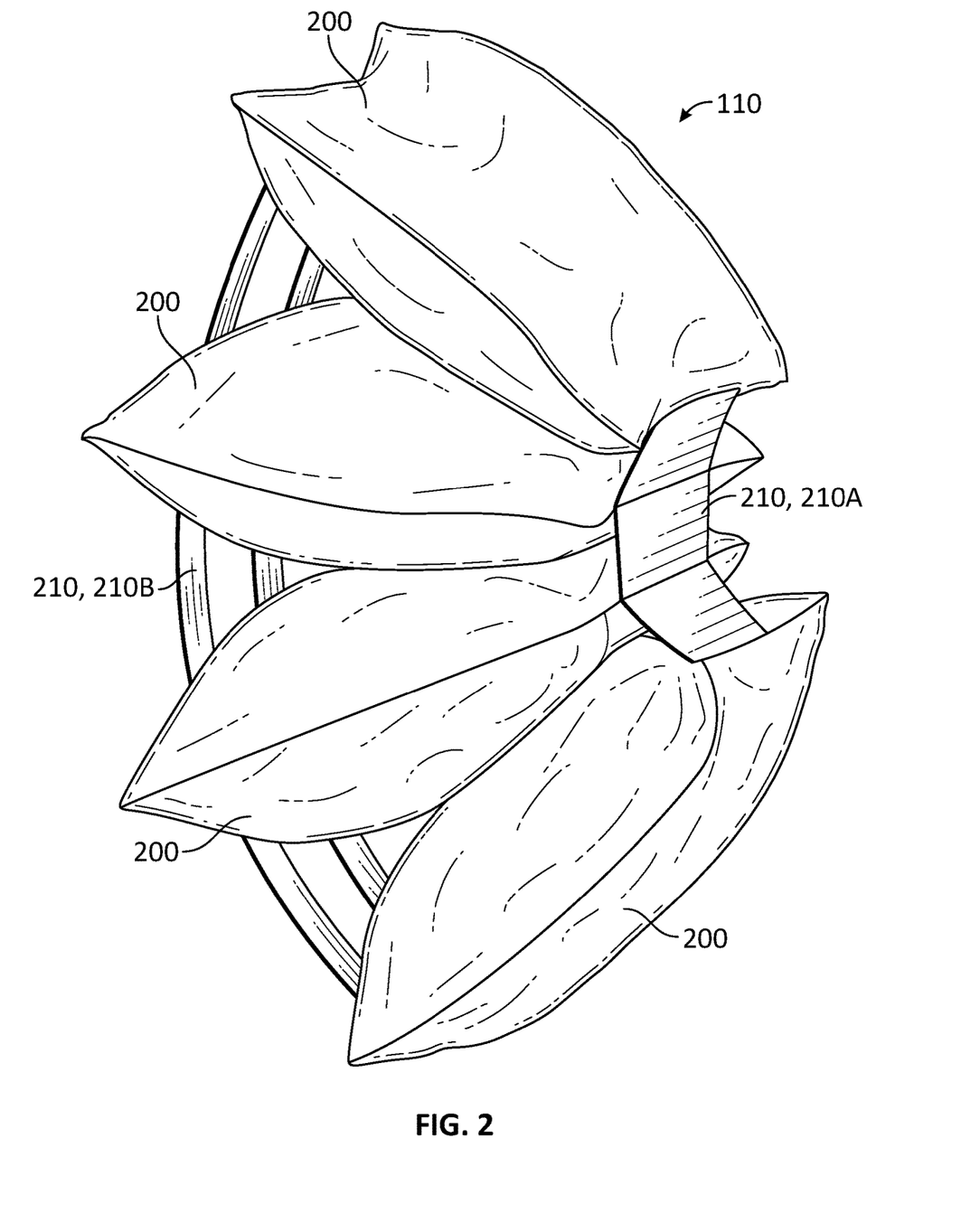
FIG. 2 is a diagram illustrating an airbag unit in a deployed state, according to one or more embodiments of the disclosure.

FIG. 2 is a diagram illustrating airbag unit 110 in a deployed state, according to one or more embodiments of the disclosure. Referring to FIG. 2, airbag unit 110 may include a plurality of airbags 200 connected via one or more tethers 210. For example, at least one tether 210 may connect ends of the airbags 200 together. As shown, airbag unit 110 includes a front tether 210A and a rear tether 210B, although other configurations are contemplated. Front tether 210A may connect occupant facing ends of airbags 200 together. Rear tether 210B may connect opposing ends of airbags 200 together (e.g., front facing ends of airbags 200). Each of front tether 210A and rear tether 210B may include one or more panels and straps (e.g., a single panel defining front tether 210A and multiple straps defining rear tether 210B).

Figure 3:
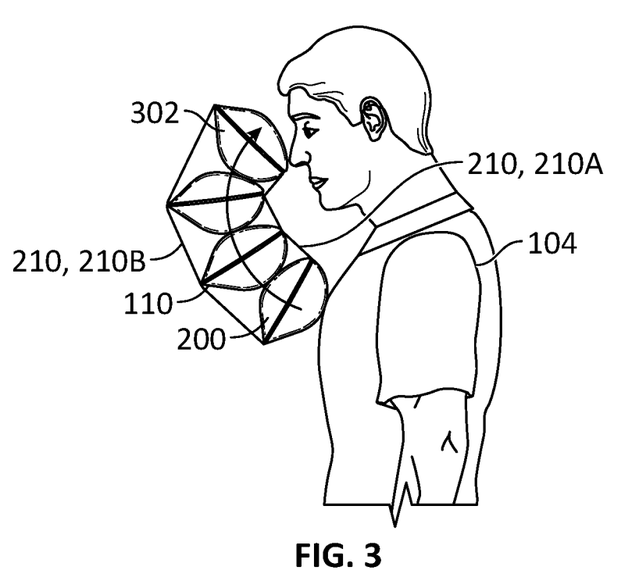
FIG. 3 is a diagram illustrating a deployment shape of the airbag unit to support the head of a vehicle occupant, according to one or more embodiments of the disclosure.

FIG. 3 is a diagram illustrating a deployment shape of airbag unit 110 to support the head of belted occupant 104, according to one or more embodiments of the disclosure. Referring to FIGS. 2-3, airbag unit 110 may be deployed in a nonlinear manner to properly position a terminal airbag 302 at the face of belted occupant 104. For example, the trajectory of deployment of airbag unit 110 may curve towards the head of belted occupant 104, as described below. The trajectory may be defined by the shape of the expanded airbags 200 and/or the tethers 210. For example, a shorter front tether 210A and a longer rear tether 210B may cause airbag unit 110 to deploy in an arcuate manner, such as curved toward the head of belted occupant 104. In embodiments, the deployment shape of airbag unit 110 may be defined by multiple deployment steps or stages, such as a first deployment and a second deployment. The first deployment may extend forward and upward relative to belted occupant 104. The second deployment may extend rearward toward the head of belted occupant 104. In this manner, airbag unit 110 may provide head restraint for belted occupant 104.

Figure 4A:
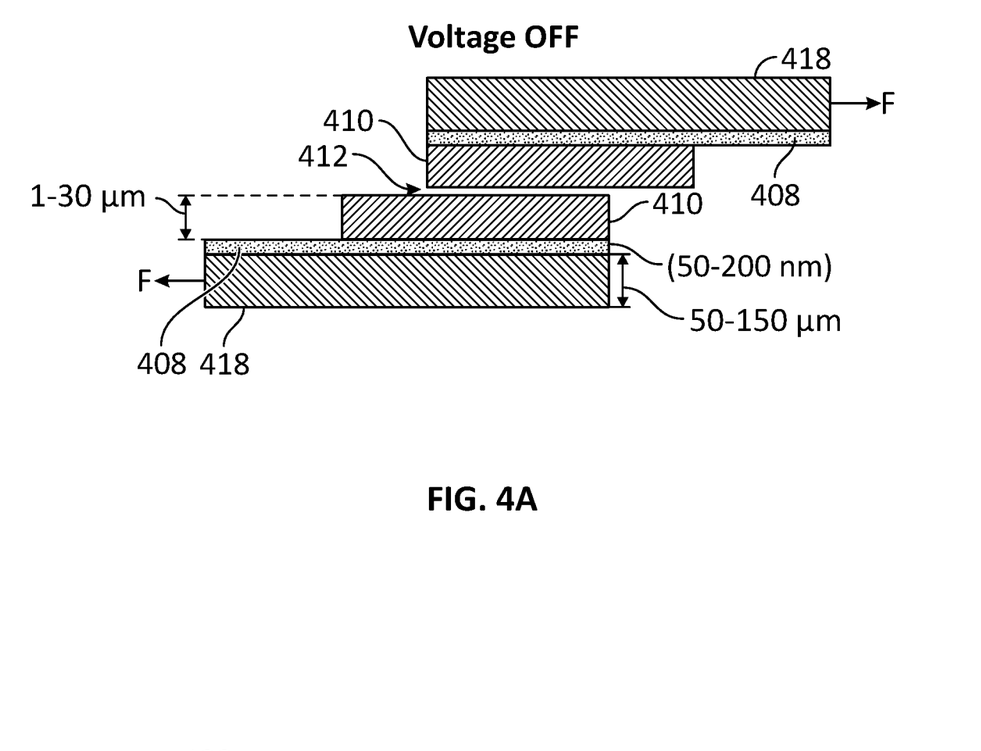
FIG. 4A is a diagram illustrating an electrostatic clutch in an off configuration, according to one or more embodiments of the disclosure.
Figure 4B:
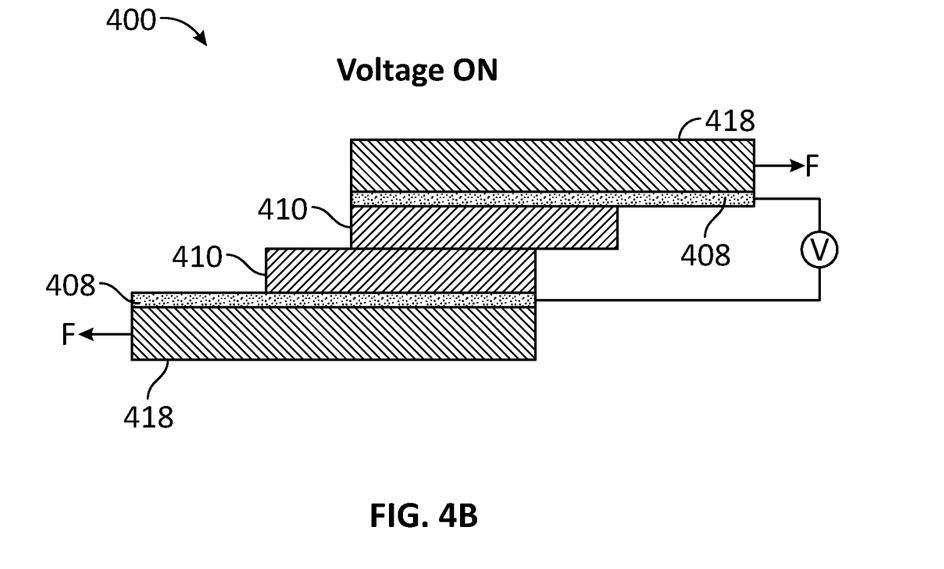
FIG. 4B is a diagram illustrating the electrostatic clutch of FIG. 4A in an on configuration, according to one or more embodiments of the disclosure.

FIG. 4A is a diagram illustrating an electrostatic clutch 400 in an off configuration, according to one or more embodiments of the disclosure. FIG. 4B is a diagram illustrating electrostatic clutch 400 in an on configuration, according to one or more embodiments of the disclosure. As shown, electrostatic clutch 400 includes two flexible and partially overlapping electrodes 408. In embodiments, electrodes 408 may be separated by one or more insulators (e.g., dielectrics 410). Electrodes 408 may be connected to respective substrates 418, such as nylon, fabric, a thermoplastic (e.g., PET), etc. Referring to FIG. 4A, when the voltage difference between the electrodes 408 is zero, the electrodes 408, and hence the substrates 418, can slide freely relative to each other since there is no electrostatic attraction between the electrodes 408. For example, an air gap 412 may be present between electrodes 408 and/or dielectrics 410 to allow sliding relative movement between substrates 418. Referring to FIG. 4B, when a voltage is applied between the electrodes 408, electrostatic attraction pulls the electrodes 408 together (e.g., reducing or eliminating the air gap 412, brining dielectrics 410 into at least partial contact, etc.). This electrically-controlled normal force increases the sliding (or shear) frictional forces between the electrodes 408, limiting or impeding sliding motion between the electrodes 408, and hence the substrates 418. In embodiments, the frictional force between the electrodes 408 may be proportional to the applied voltage, such that the sliding (or shear) frictional forces between the electrodes 408 can be controlled by varying the applied voltage.

Figure 5A:
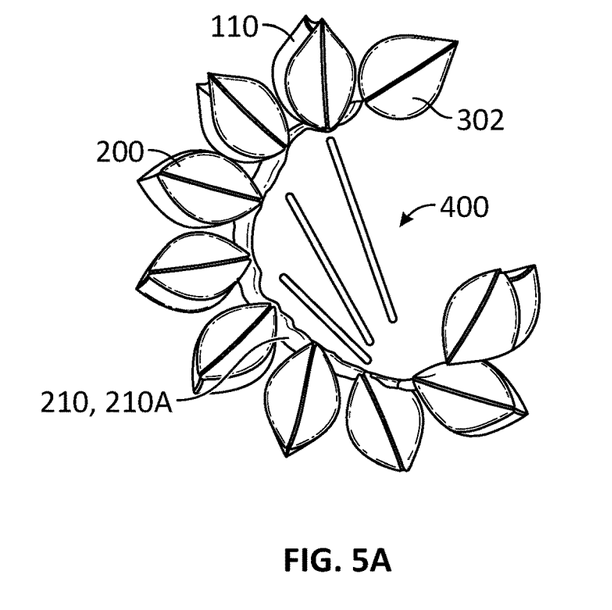
FIG. 5A is a diagram illustrating use of an electrostatic clutch to control a vertical deployment of the airbag unit, according to one or more embodiments of the disclosure.
Figure 5B:
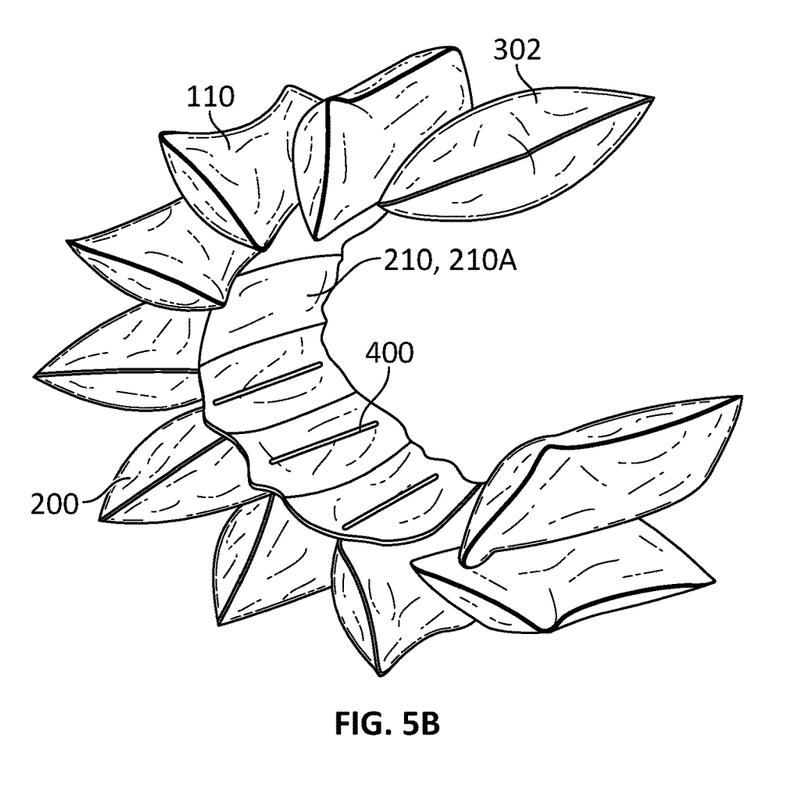
FIG. 5B is a diagram illustrating use of an electrostatic clutch to control a horizontal or lateral deployment of the airbag unit, according to one or more embodiments of the disclosure.

FIGS. 5A-5B are diagrams illustrating use of electrostatic clutch 400 to control a deployment of airbag unit 110 (e.g., airbags 200), according to one or more embodiments of the disclosure. Referring to FIGS. 5A-5B, electrostatic clutch 400 may limit a movement of airbags 200 relative to each other to define the deployment shape of airbag unit 110. In embodiments, electrostatic clutch 400 may be associated with a tether 210 of airbag unit 110 (e.g., front tether 210A and/or rear tether 210B) to define the deployment shape of airbag unit 110. For example, the electrodes 408 of electrostatic clutch 400 may be connected to or integrated with a tether 210 of airbag unit 110, such as substrates 418 defining at least a portion of tether 210, although other configurations are contemplated.

FIG. 5A illustrates an exemplary vertical clutch arrangement of electrostatic clutch 400. Referring to FIG. 5A, electrostatic clutch 400 may be operable to define a vertical deployment of airbag unit 110 relative to belted occupant 104. For example, the vertical clutch arrangement may control a vertical position (e.g., an up/down position) of airbag unit 110 during deployment. In embodiments, the vertical clutch arrangement of electrostatic clutch 400 may control the curve of airbag unit 110 toward the face of belted occupant 104. For instance, the vertical clutch arrangement may cause airbag unit 110 to have a C-shaped deployment, although other configurations are contemplated. In embodiments, the vertical positioning of terminal airbag 302 may be adapted to belted occupant 104. For example, the vertical position of terminal airbag 302 may be raised or lowered based on the size of belted occupant 104, the position of the belted occupant's head, the body position of belted occupant 104 within the seat, etc. In embodiments, the vertical arrangement of the deployed airbag unit 110 may be adjusted based on one or more sensor inputs (e.g., sensor signals from a camera, a load sensor, a seatbelt position sensor, etc.).

FIG. 5B illustrates an exemplary horizontal clutch arrangement of electrostatic clutch 400. Referring to FIG. 5B, electrostatic clutch 400 may be operable to define a horizontal or lateral deployment of airbag unit 110 relative to belted occupant 104. For instance, the horizontal clutch arrangement may control a horizontal position (e.g., a left/right position) of airbag unit 110 during deployment. In embodiments, the horizontal clutch arrangement of electrostatic clutch 400 may control a lateral curve of airbag unit 110 relative to belted occupant 104. For instance, the horizontal clutch arrangement may work in conjunction with the vertical clutch arrangement of electrostatic clutch 400 to cause airbag unit 110 to twist during deployment to align the airbag to the belted occupant 104. In embodiments, the horizontal positioning of terminal airbag 302 may be adapted to belted occupant 104, such as adjusting the lateral position of terminal airbag 302 based on the position of the belted occupant's head, the body position of belted occupant 104 within the seat, etc. In embodiments, the lateral arrangement of the deployed airbag unit 110 may be adjusted based on one or more sensor inputs (e.g., sensor signals from a camera, a load sensor, a seatbelt position sensor, etc.).

Figure 6A:
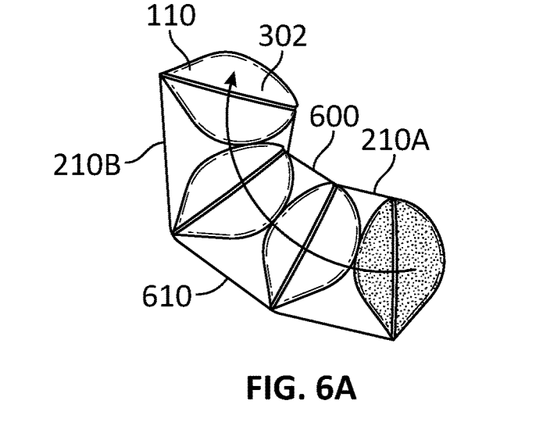
FIGS. 6A-6C illustrate different deployment shapes of an airbag unit using a plurality of electrostatic clutches, according to one or more embodiments of the disclosure.
Figure 6B:
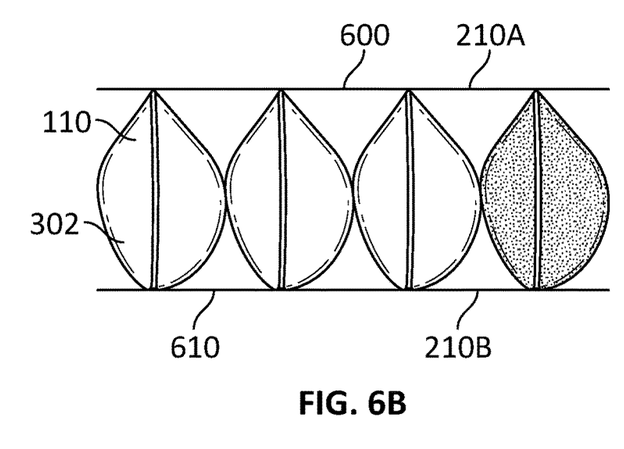
Figure 6C:
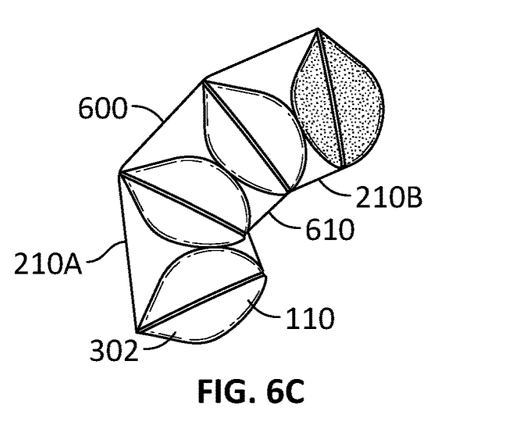

FIGS. 6A-6C illustrate different deployment shapes of airbag unit 110 using a plurality of electrostatic clutches, according to one or more embodiments of the disclosure. Referring to FIGS. 6A-6C, airbag unit 110 may include a first electrostatic clutch 600 and a second electrostatic clutch 610. First electrostatic clutch 600 may define or be incorporated into a first tether (e.g., front tether 210A) of airbag unit 110, such as on a first side of airbag unit 110. Second electrostatic clutch 610 may define or be incorporated into a second tether (e.g., rear tether 210B) of airbag unit 110, such as on a second side of airbag unit 110 opposite first electrostatic clutch 600. The first and second electrostatic clutches 600, 610 may work together to define the deployment shape of airbag unit 110. For example, selective activation of first electrostatic clutch 600 and/or second electrostatic clutch 610 may control the trajectory of deployment of airbag unit 110, such as forward and upward, forward and downward, or simply forward.

Referring to FIG. 6A, a first deployment configuration is illustrated in which the trajectory of deployment of airbag unit 110 is generally forward and upward. In such embodiments, the forward and upward deployment trajectory may be defined by activating first electrostatic clutch 600 more than second electrostatic clutch 610. For instance, first electrostatic clutch 600 may be activated, and second electrostatic clutch 610 may be kept off, although other configurations are contemplated.

Referring to FIG. 6B, a second deployment configuration is illustrated in which the trajectory of deployment of airbag unit 110 is generally straight forward. In such embodiments, the forward deployment trajectory may be defined by activating and/or deactivating first and second electrostatic clutches 600, 610 to the same degree. For example, both first and second electrostatic clutches 600, 610 may be kept off to deploy airbag unit 110 forward, although other configurations are contemplated, including activating both first electrostatic clutch 600 and second electrostatic clutch 610.

Referring to FIG. 6C, a third deployment configuration is illustrated in which the trajectory of deployment of airbag unit 110 is generally forward and downward. In such embodiments, the forward and downward deployment trajectory may be defined by activating second electrostatic clutch 610 more than first electrostatic clutch 600. For instance, second electrostatic clutch 610 may be activated, and first electrostatic clutch 600 may be kept off, although other configurations are contemplated.

Figure 7:
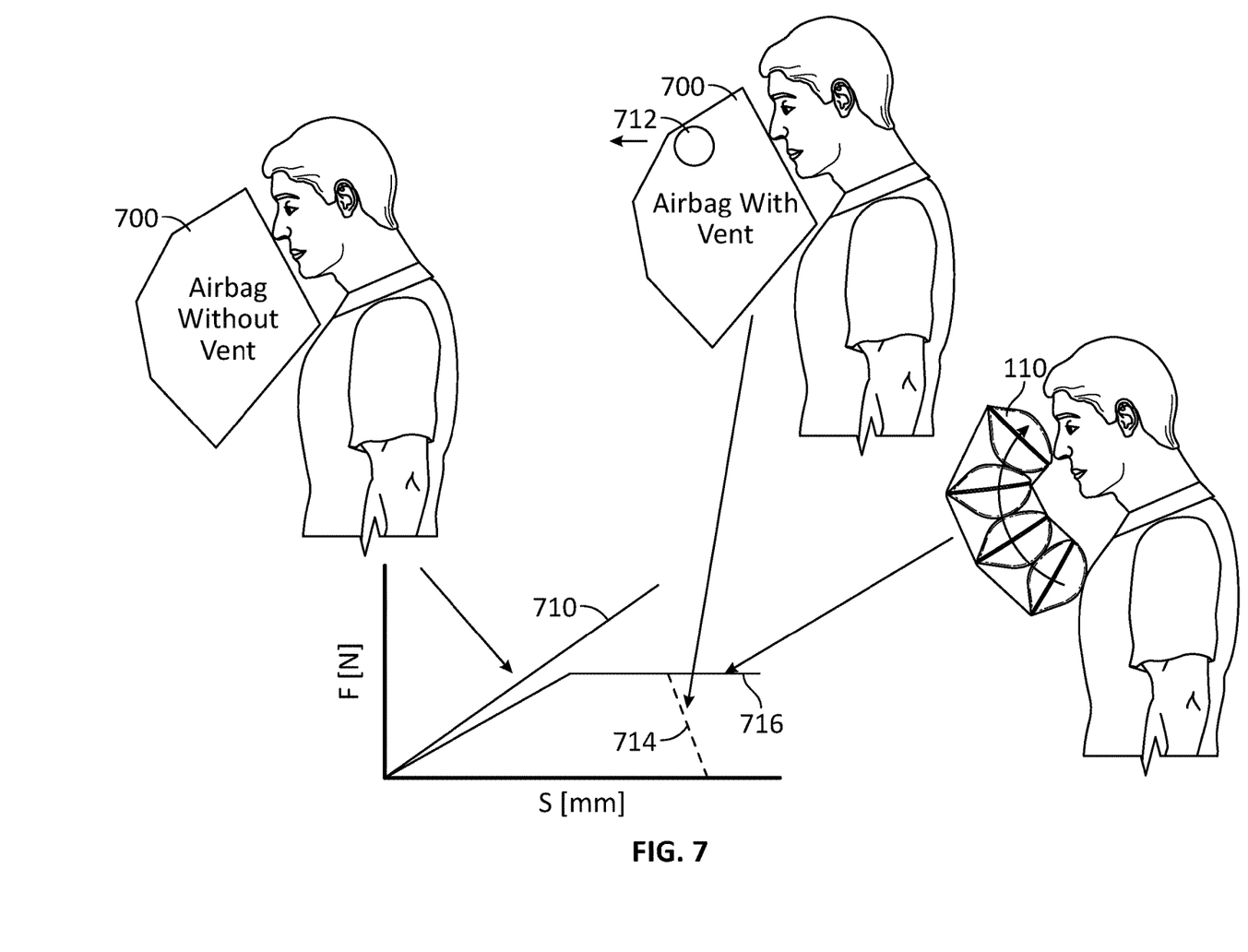
FIG. 7 is a diagram illustrating different force curves associated with different airbag configurations, according to one or more embodiments of the disclosure.

FIG. 7 is a diagram illustrating different force curves associated with different airbag configurations, according to one or more embodiments of the disclosure. Referring to FIG. 7, a conventional airbag 700 may generate a linear (e.g., steep) force vs. stroke curve 710. As shown, a vent 712 may be added to decrease the force curve 714, such as to limit excessive forces. With respect to airbag unit 110, however, the interactions among the different airbags 200 and/or tether(s) may generate a flat force vs stroke curve 716 and keep airbag unit 110 in position and inflated. In embodiments, the force curve can be tuned by changing the airbag or pillow shape and volume.

Figure 8:
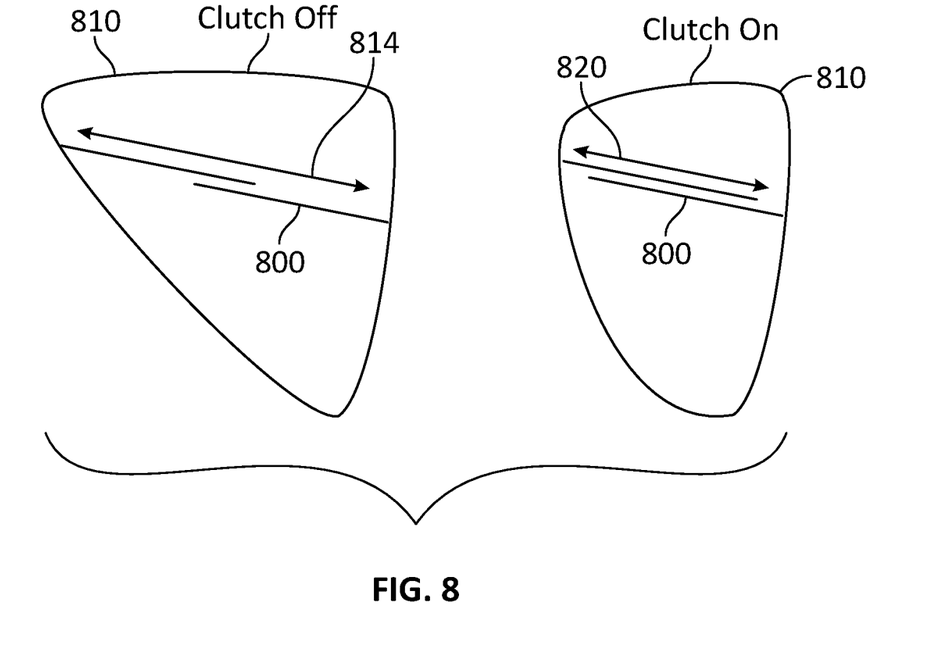
FIG. 8 is a diagram illustrating use of an internal electrostatic clutch to control a deployment shape of an airbag, according to one or more embodiments of the disclosure.

FIG. 8 is a diagram illustrating use of an internal electrostatic clutch (internal clutch 800) to control a deployment shape of an airbag 810, according to one or more embodiments of the disclosure. Except as otherwise provided below, internal clutch 800 may be similar to electrostatic clutch 400, described above. Referring to FIG. 8, internal clutch 800 may be placed inside or embedded within airbag 810. In such embodiments, electrostatic clutch may operate to control a deployment shape of airbag 810. For example, when internal clutch 800 is off, airbag 810 may include a first deployment shape, such as a triangular shape as shown, encompassing a first volume and/or defining a first extended dimension 814. When internal clutch 800 is on, airbag 810 may include a second deployment shape, such as a compressed triangular shape as shown, encompassing a second volume and/or defining a second extended dimension 820. As shown, second extended dimension 820 may be less than first extended dimension 814. Similarly, second volume may be less than first volume. In such embodiments, the deployment shape of airbag 810 may be adaptively changed as necessary, such as to adapt airbag 810 based on a seated position of a vehicle occupant (e.g., smaller deployment shape for occupants sitting close to dash or steering wheel, etc.).

Figure 9:
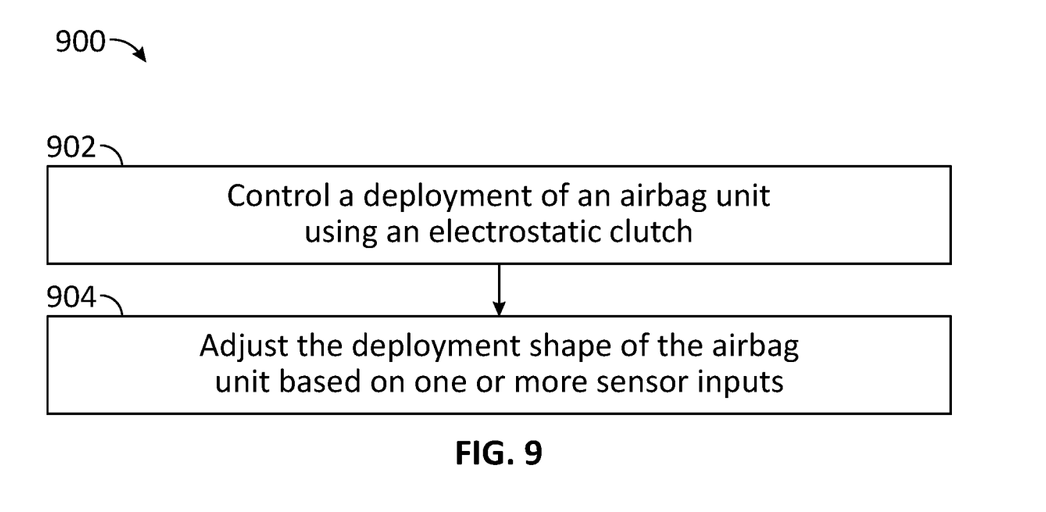
FIG. 9 is a flowchart of a method of controlling deployment of an airbag unit, according to one or more embodiments of the disclosure.

FIG. 9 is a flowchart of a method 900 of controlling deployment of an airbag unit, according to one or more embodiments of the disclosure. For explanatory purposes, method 900 is described herein with reference to FIGS. 1-8, although method 900 is not limited to the embodiments illustrated in FIGS. 1-8. Note that one or more operations in FIG. 9 may be combined, omitted, and/or performed in a different order as desired.

In block 902, method 900 includes controlling a deployment of an airbag unit using an electrostatic clutch. The airbag unit and the electrostatic clutch may be similar to airbag unit 110 and electrostatic clutch, respectively, described above. For example, the electrostatic clutch may be operable to limit a movement of the airbag unit to define a deployment shape of the airbag unit, such as in a manner as described above. Block 902 may include defining the deployment shape of the airbag unit using at least one tether (e.g., front tether 210A and/or rear tether 210B). In embodiments, the electrostatic clutch may be associated with at least one tether of the airbag unit. For example, the electrostatic clutch may define or be embedded in a tether of airbag unit. Block 902 may include controlling at least one of a vertical deployment or a horizontal deployment of the airbag unit to position the airbag unit toward the head of a vehicle occupant. For instance, the electrostatic clutch may control the vertical and/or lateral position of the airbag unit (e.g., a terminal airbag of the airbag unit) to place the terminal airbag at the face of the vehicle occupant at deployment.

In block 904, method 900 includes adjusting the deployment shape of the airbag unit based on one or more sensor inputs. In embodiments, block 904 includes adaptively changing the deployment shape based on a sensed condition of a vehicle occupant. For instance, the electrostatic clutch may adaptively change the overall location of the airbag unit based on a sitting position, a body position, a size, and/or other characteristics of the vehicle occupant as detected by one or more sensors (e.g., a camera, a load sensor, a seatbelt position sensor, etc.).

Figure 10:
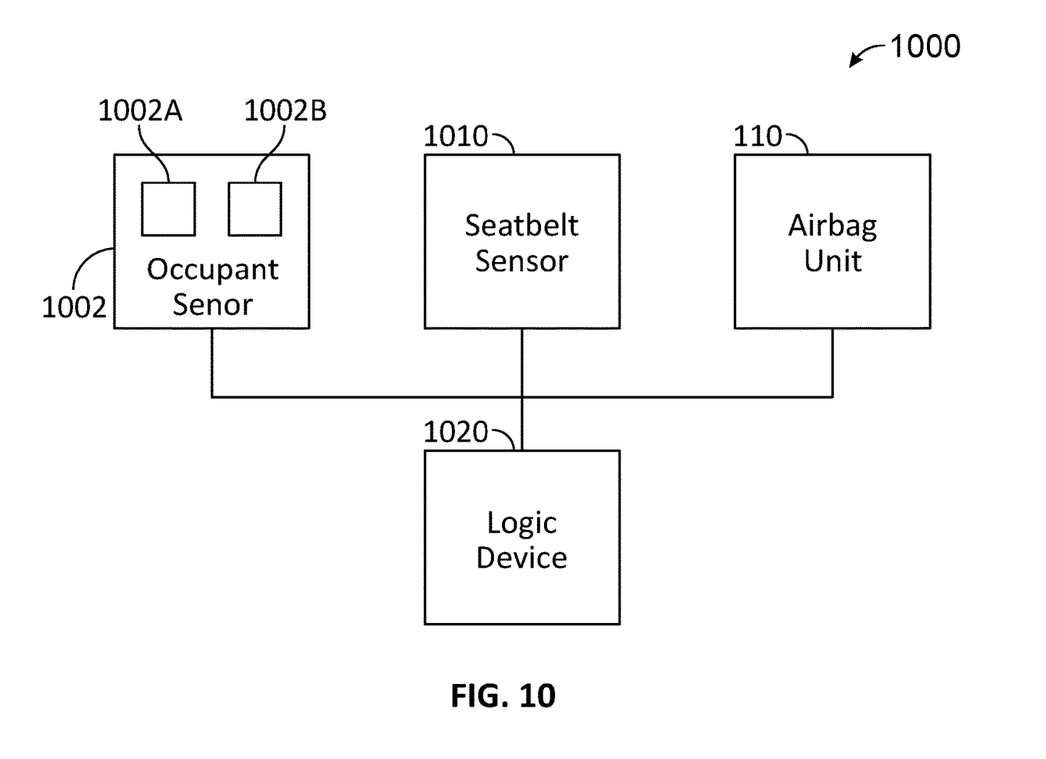
FIG. 10 is a diagram of an example vehicle system, according to one or more embodiments of the disclosure.

FIG. 10 is a diagram of an example vehicle system 1000, according to one or more embodiments of the disclosure. Referring to FIG. 10, vehicle system 1000 may include one or more features, modules, or components configured to control a deployment of airbag unit 110. As shown, vehicle system 1000 includes an occupant sensor 1002, a seatbelt sensor 1010, airbag unit 110, and a logic device 1020.

Occupant sensor 1002 may monitor one or more vehicle occupants, such as a rear occupant, the driver, a passenger, etc. In embodiments, occupant sensor 1002 may include a camera 1002A and/or a load sensor 1002B. The camera 1002A may detect head position, face direction, body size and location, or the like. The camera 1002A may be used alone or in combination with other sensors (e.g., seatbelt sensor 1010, load sensor 1002B) to determine body position within a seat. The load sensor 1002B may detect a load placed on a vehicle seat. For example, load sensor 1002B may detect whether an occupant is sitting in the vehicle seat, the body position of the occupant in the vehicle seat (e.g., closer to front or one side of vehicle seat), and/or the weight of the vehicle occupant (e.g., weights correlated to a small child, an average adult, a heavier adult, etc.).

Seatbelt sensor 1010 may monitor a characteristic of a seatbelt associated with a detected vehicle occupant. For example, seatbelt sensor 1010 may detect whether seatbelt 106 is secured, is positioned properly on belted occupant 104, is functioning properly, or the like. In embodiments, seatbelt sensor 1010 may detect an extension characteristic of the seatbelt, such as to determine a body size of the vehicle occupant (e.g., greater extension correlating to larger body sizes and vice versa).

Logic device 1020 may be any controller, processor, module, circuitry, or device configured to perform one or more operations. Logic device 1020 may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of the occupant sensor 1002, seatbelt sensor 1010, and/or other elements of vehicle system 1000, for example. Such software instructions may also implement methods for processing images and/or other sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle system 1000).

Logic device 1020 may be communicatively connected to occupant sensor 1002, seatbelt sensor 1010, and airbag unit 110. Logic device 1020 may be configured to receive data from at least one sensor of vehicle system 1000. For example, logic device 1020 may receive data or other sensor signals from occupant sensor 1002 and seatbelt sensor 1010. Depending on the application, logic device 1020 may receive and transmit data over wired or wireless communication.

Based on data received, logic device 1020 may be configured to adjust the deployment shape of airbag unit 110 based on one or more sensor inputs. For instance, based on one or more sensed inputs, logic device 1020 may control vertical and lateral deployment of airbag unit 110 using electrostatic clutch to adaptively position the airbag unit 110 to the vehicle occupant (e.g., at the face of belted occupant 104 at deployment). For example, logic device 1020 may control a curving of airbag unit 110 to position terminal airbag 302 of airbag unit 110 toward the face of belted occupant 104 at deployment to support the belted occupant's head during a crash or collision.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A vehicle comprising:
   a seatbelt; and
   an airbag unit mounted on the seatbelt, the airbag unit comprising:
      a plurality of airbags, and
      an electrostatic clutch to control a deployment of the plurality of airbags, wherein the electrostatic clutch is operable to limit a movement of the plurality of airbags relative to each other to define a deployment shape of the airbag unit.

2. The vehicle of claim 1, further comprising:
   a tether connecting the plurality of airbags together; and
   wherein the electrostatic clutch is associated with the tether to define the deployment shape of the airbag unit.

3. The vehicle of claim 2, wherein the airbag unit comprises a front tether and a rear tether, and wherein the electrostatic clutch is associated with at least one of the front tether or the rear tether.

4. The vehicle of claim 2, wherein the electrostatic clutch comprises:
   a vertical clutch arrangement to control a vertical position of the airbag unit; and
   a horizontal clutch arrangement to control a horizontal position of the airbag unit.

5. The vehicle of claim 1, wherein the electrostatic clutch is operable to define a vertical deployment of the airbag unit relative to a vehicle occupant.

6. The vehicle of claim 5, wherein the deployment shape of the airbag unit is defined by:
   a first deployment extending forward and upward relative to a vehicle occupant; and
   a second deployment extending rearward toward the face of vehicle occupant to support the head of the vehicle occupant.

7. The vehicle of claim 1, further comprising a control system to adjust the deployment shape of the airbag unit based on one or more sensor inputs.

8. A seatbelt assembly for a vehicle, the seatbelt assembly comprising:
   a plurality of airbags; and
   an electrostatic clutch to control a deployment of the plurality of airbags, wherein the electrostatic clutch is operable to limit a movement of the plurality of airbags relative to each other to define a deployment shape of the plurality of airbags.

9. The seatbelt assembly of claim 8, further comprising:
   at least one tether connecting ends of the plurality of airbags together; and
   wherein the electrostatic clutch is associated with the at least one tether to define the deployment shape of the plurality of airbags.

10. The seatbelt assembly of claim 9, wherein:
    the at least one tether comprises a front tether and a rear tether; and
    the electrostatic clutch is associated with at least one of the front tether or the rear tether.

11. The seatbelt assembly of claim 9, wherein the electrostatic clutch comprises:
    a vertical clutch arrangement to control a vertical position of the airbag unit; and
    a horizontal clutch arrangement to control a horizontal position of the airbag unit.

12. The seatbelt assembly of claim 8, wherein the electrostatic clutch is operable to define a vertical deployment of the plurality of airbags relative to a vehicle occupant.

13. The seatbelt assembly of claim 12, wherein the deployment shape of the plurality of airbags is defined by:
    a first deployment extending forward and upward relative to a vehicle occupant; and
    a second deployment extending rearward toward the head of the vehicle occupant.

14. The seatbelt assembly of claim 8, further comprising a control system to adjust the deployment shape of the plurality of airbags based on one or more sensor inputs.

15. A vehicle comprising the seatbelt assembly of claim 8.

16. A method comprising:
    controlling a deployment of an airbag unit using an electrostatic clutch; and
    wherein the electrostatic clutch is operable to limit a movement of the airbag unit to define a deployment shape of the airbag unit.

17. The method of claim 16, wherein the controlling the deployment of the airbag unit comprises defining the deployment shape of the airbag unit using at least one tether, wherein the electrostatic clutch is associated with the at least one tether.

18. The method of claim 16, wherein the controlling the deployment of the airbag unit comprises controlling at least one of a vertical deployment or a horizontal deployment of the airbag unit to position the airbag unit toward the head of a vehicle occupant.

19. The method of claim 16, further comprising adjusting the deployment shape of the airbag unit based on one or more sensor inputs.

20. The method of claim 19, wherein the adjusting the deployment shape comprises adaptively changing the deployment shape based on a sensed condition of a vehicle occupant.

\* \* \* \* \*